United States Patent [19]

Stokes et al.

[11] 3,833,348

[45] Sept. 3, 1974

[54] METHOD OF JOINING A PAIR OF SILICON NITRIDE PARTS

[75] Inventors: Roger Francis Stokes, Birmingham; Brian John Hunt, Warwickshire, both of England

[73] Assignee: Joseph Lucas (Industries) Limited, Birmingham, England

[22] Filed: Mar. 14, 1972

[21] Appl. No.: 234,620

[30] Foreign Application Priority Data
Mar. 24, 1971 Great Britain...................... 7874/71
May 21, 1971 Great Britain.................... 16452/71

[52] U.S. Cl............................ 65/43, 65/36, 65/374
[51] Int. Cl............................................. C03c 27/00
[58] Field of Search.................. 65/43, 36, 374, 45; 423/344

[56] References Cited
UNITED STATES PATENTS

| | | | |
|---|---|---|---|
| 2,750,268 | 6/1956 | Lewiston et al. | 423/344 X |
| 2,777,254 | 1/1957 | Siefert et al. | 65/374 |
| 3,030,257 | 4/1962 | Whearley et al. | 156/52 |
| 3,269,818 | 8/1966 | Tiede | 65/59 X |
| 3,281,309 | 10/1966 | Ross | 161/196 |
| 3,334,974 | 8/1967 | Fletcher et al. | 423/344 X |
| 3,367,696 | 2/1968 | Langley | 65/59 |
| 3,410,674 | 10/1968 | Martin | 65/36 X |
| 3,414,465 | 12/1968 | Baak et al. | 65/30 X |
| 3,468,647 | 9/1969 | Buyers et al. | 65/36 X |
| 3,494,026 | 2/1970 | Sugaya | 65/36 X |
| 3,681,044 | 8/1972 | Ruszczyk et al. | 65/43 X |
| 3,687,650 | 8/1972 | Case et al. | 65/45 |

OTHER PUBLICATIONS

"Fine Ceramics," Norton, Copyright 1970 by McGraw Hill, pp. 185–197.
"Porcelain Enamels," Andrews, 1961, The Garrard Press, pp. 51–57.

*Primary Examiner*—S. Leon Bashore
*Assistant Examiner*—Kenneth M. Schor
*Attorney, Agent, or Firm*—Holman & Stern

[57] ABSTRACT

To join a pair of silicon nitride parts, a powdered glass containing silicon, aluminium, an alkaline earth metal and oxygen is provided on at least one of the parts to be joined. The powdered glass is then heated so as to produce molten glass between the parts whereby, on cooling, the glass provides a joint between the parts.

The powdered glass can also contain silicon, manganese and oxygen, together with aluminium.

5 Claims, 1 Drawing Figure

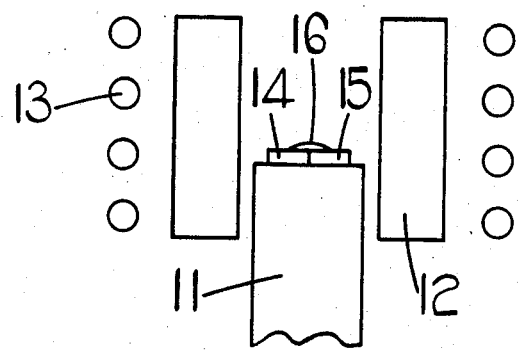

METHOD OF JOINING A PAIR OF SILICON NITRIDE PARTS

This invention relates to a method of joining a pair of silicon nitride parts.

A method, according to one aspect of the invention, comprises the steps of:
a. starting with a powdered glass containing silicon, aluminium, an alkaline earth metal and oxygen,
b. providing the powdered glass on at least one of the parts to be joined, and
c. heating the powdered glass so as to produce molten glass between the parts whereby, on cooling, the glass provides a joint between the parts.

In a further aspect of the invention, the powdered glass contains silicon, manganese, and oxygen, conveniently together with aluminium.

Preferably, the heating step (c) is carried out in an atmosphere inert to the silicon nitride parts.

Conveniently, the powdered glass is provided between the parts to be joined and the parts are pressed together during the heating step (c) and the subsequent cooling of the molten glass.

The accompanying drawing illustrates schematically apparatus suitable for use in performing a method according to one example of the invention.

Referring to the drawing, in the example shown two hot pressed silicon nitride parts 14,15 are to be joined together and are initially ground along the two edges to be joined to produce a surface finish better than 30 micro inches on the respective edge surfaces. The silicon nitride parts are then placed in edge-to-edge contact on a graphite pedestal 11 which is positioned within a susceptor 12 forming part of a furnace heated by an induction coil 13 which conveniently is water cooled.

Powdered glass 16 is placed on the parts 14 and 15 and the furnace is then evacuated and filled with pure nitrogen. The pedestal 11 is then heated by current flowing through the coil 13, so that the parts 14,15 are heated to a temperature above the melting point of the glass 16, which flows into the crack defined between the parts 14,15 and, on cooling, provides the required joint between the parts.

One glass which has proved to be suitable in the above method is formed by fusing at 1,550° C a mixture consisting of 51.4% silica, 34.9% alumina and 13.7% magnesium oxide, all by weight, the fused mixture then being pulverised to produce the required powdered glass. In producing the joint between the silicon nitride parts 14,15 using this particular glass, the parts are heated to a temperature of 1,600° C on the pedestal 11. Other glasses of silica, alumina and magnesium oxide which have been found to be suitable have the following composition by weight:

SILICA between 50% and 80%
ALUMINA between 10% and 40%
MAGNESIUM OXIDE between 10% and 25%

Of course, all the glasses within the above range of glass compositions have different melting points, but in each case the glass is produced by heating the components at the melting point of the particular glass and then grinding the fused mixture to provide the required powder. Also, in each case the glass powder when provided on the parts 14,15 is, in effecting a joint between the parts, heated to a temperature above its melting point. Thus, a glass mixture consisting of 64% by weight silica, 10% by weight alumina and 26% by weight of magnesium oxide has a melting point of 1,470° C and is heated to about 1,670° C in forming the joint between the parts 14,15. Another glass consisting of 62.0% by weight of silica, 17.0% by weight of alumina and 21.0% of magnesium oxide has a melting point of 1,355° C and is heated to 1,500° C during the joining operation. A further glass consisting of 66% by weight of silica, 5% by weight of alumina and 29% by weight of magnesium oxide has a melting point of 1,500° C and is heated to 1,700° C to join the parts 14, 15.

In another glass formulation which has proved to be suitable for joining the parts 14,15, calcium oxide replaces the magnesium oxide used above. Suitable compositions for this other glass are:

SILICA between 15 and 63% by weight
ALUMINA between 11 and 53% by weight
CALCIUM OXIDE between 11 and 50% by weight.

The preferred composition for this other glass is 60% by weight silica, 15% by weight alumina and 25% by weight calcium oxide.

The other alkaline earth oxides, that is strontium oxide and barium oxide, have also been found to produce glasses with silica and alumina which are suitable for joining the parts 14, 15. The range of compositions for these additional glasses which have been found to give satisfactory results are as follows:

SILICA between 27 and 50% by weight
ALUMINA between 5 and 38% by weight
STRONTIUM OXIDE between 25 and 70% by weight and, SILICA between 18 and 50% by weight
ALUMINA between 10 and 37% by weight
BARIUM OXIDE between 30 and 65% by weight.

In the case of the strontium oxide glass, the preferred composition is 41% by weight silica, 14% by weight alumina and 45% by weight strontium oxide, whereas for the barium oxide glass the preferred composition is 25% by weight silica, 10% by weight alumina and 65% by weight barium oxide.

Further glasses which have been found to be suitable for joining the parts 14,15 consist of silica and manganese oxide together with, in some cases, alumina. One such suitable further glass consists of 38% by weight silica and 62% by weight of manganese oxide, this glass having a melting point of 1,251° C and being heated to 1,400° C during the joining operation. Another suitable glass for joining the parts 14,15 consists of 39% by weight of silica, 50% by weight of manganese oxide and 11% by weight of alumina, the glass having a melting point of about 1,000° C and being heated to about 1,200° C during the joining operation. Other similar glasses have proved to be suitable for joining the parts 14,15, satisfactory results being obtained provided the glass lies within the following composition range:

SILICA between 30 and 60% by weight
ALUMINA up to 32% by weight
MANGANESE OXIDE between 11 and 57% by weight.

In addition to the joining of hot pressed silicon nitride parts, each of the above glasses have been found to be suitable for joining a pair of reaction bonded silicon nitride parts and for joining a reaction bonded part to a hot pressed part.

In a modification (not shown) of the above example, the glass powder is made into a paste with water and is applied to the region of one of the parts which is to be joined to the other part so as to produce a coating about 1 mm. thick on the one part, care being taken to avoid trapped air in the coating. The parts are then assembled together so that the glass paste is positioned between the regions to be joined of the parts and the glass is heated above its melting point so that, on cooling, the required joint is produced. Preferably, the parts are pressed together during the joining operation.

Using the method of the invention, it is also possible to join pairs of porous silicon nitride parts. In this respect, it is to be appreciated that a porous silicon nitride product can be produced, for example, by mixing silicon powder with a temporary binder and then forming the mixture into a body, which is subsequently nitrided. The temporary binder is removed from the body during the nitriding, or at an earlier heating step, and the loss of the binder from the body results in the final silicon nitride product being porous. A glass suitable for joining a pair of porous silicon nitride parts consists of 39% by weight of silica, 50% by weight of manganese oxide, and 11% by weight of alumina. This glass is also described above from where it will be seen that the melting point of the glass is about 1,000° C and the glass is heated to about 1,200° C during the joining operation.

Using the glasses described above, joints between pairs of silicon nitride parts have been obtained with modulus of rupture values, measured in each case across the joint, of up to 40,000 p.s.i., the minimum strength of the joint being 10,000 p.s.i.

It is to be appreciated that fusion of the glasses described above can be effected by the use of an oxacetylene torch or any other convenient heating method, instead of by heating the powdered glass in a furnace. It is, however, to be noted that where joining of a pair of silicon nitride parts involves heating a suitable powdered glass above 1,350° C, then it is preferable that the heating is effected in an atmosphere inert to the silicon nitride, such as pure nitrogen or argon, so that any tendency for the silicon nitride to oxidise is prevented. Care also must be taken to ensure that the glass is not reduced.

Also, it is to be understood that in forming each of the glasses described above, it is not essential to fuse a mixture of the metal oxides which are to compose the glass. The material which is fused into the glass could alternatively be composed of compounds of the relevant metals which at the fusion temperature would provide the necessary constituents of the glass. Thus, for example, to produce a glass containing silica, alumina, and magnesium oxide, it is possible to fuse a mixture containing ethyl silicate, magnesium carbonate and aluminium hydroxide, or alternatively a mixture containing clino-enstatite ($MgSiO_2$) and aluminium hydroxide. Further certain spinels, i.e., compounds of magnesium oxide and alumina, and certain mullites, i.e., compounds of silica and alumina, can be used to provide constituents of suitable glass forming mixtures. In addition, cordierite, a compound having the composition $2MgO \cdot 2Al_2O_3 \cdot 5SiO_2$, can be fused directly into a glass suitable for use in the method of the invention.

We claim:

1. A method of joining a pair of silicon nitride parts comprising the steps of:
   a. providing a powdered glass containing silicon, manganese and oxygen on at least one of the parts to be joined, and
   b. heating the powdered glass so as to produce molten glass between the parts whereby, on cooling, the glass provides a joint between the parts.

2. A method as claimed in claim 1 wherein the powdered glass also contains aluminium.

3. A method as claimed in claim 2 wherein the composition of the glass by weight lies within the following range:

SILICA between 30% and 60%
   ALUMINA up to 32%
   MANGANESE OXIDE between 11% and 57%.

4. A method as claimed in claim 1 wherein the powdered glass is provided between the parts to be joined and the parts are pressed together during the heating step (b) and the subsequent cooling of the molten glass.

5. A method as claimed in claim 1 wherein the heating step (b) is carried out in an atmosphere inert to the silicon nitride parts.

* * * * *